United States Patent [19]
Oh

[11] Patent Number: 5,304,908
[45] Date of Patent: Apr. 19, 1994

[54] QUANTIZING ERROR REMOVING CIRCUIT FOR A ROTATIONAL CONTROL DEVICE

[75] Inventor: Young G. Oh, Seoul, Rep. of Korea

[73] Assignee: Goldstar Co., Ltd., Seoul, Rep. of Korea

[21] Appl. No.: 993,269

[22] Filed: Dec. 18, 1992

[30] Foreign Application Priority Data

Dec. 19, 1991 [KR] Rep. of Korea ............... U91-22843

[51] Int. Cl.$^5$ ..................... H02P 5/00; G05B 11/26
[52] U.S. Cl. ................................. 318/629; 318/608
[58] Field of Search ............... 318/560, 569, 600, 608, 318/611, 623, 628, 629

[56] References Cited

U.S. PATENT DOCUMENTS

| | | | |
|---|---|---|---|
| 3,662,242 | 5/1972 | Wacker et al. | 318/573 |
| 4,668,900 | 5/1987 | Tabuchi | 318/608 |

Primary Examiner—Bentsu Ro
Attorney, Agent, or Firm—Pennie & Edmonds

[57] ABSTRACT

A quantizing error removing circuit for a rotational control device applied to a servo circuit and the like of a video cassette recorder, designed to removing the quantizing error generated upon controlling the speed and phase, minimizing a change of gain characteristic of a control device, thereby improving its efficiency. The circuit according to the present invention includes a moving average filter which comprises a predetermined number of delay elements connected in series to each other in order to delay by a predetermined set time, a phase error control signal outputted from a phase control filter; a summer for summing the phase error control signal and each output of the delay elements; a divider for dividing a summed output value of the summer by the number of summing signals, thereby outputting the divided quotient as a phase control signal; and another delay element for delaying the remainder value outputted from the divider by a predetermined set time, thereby feeding the remainder value back to the summer. The remainder value fed back from said other delay element to the summer is summed with the summed value of the summer at the next sampling time point, and according to this, generation of quantizing error caused by the presence of the remainder value is prevented.

4 Claims, 4 Drawing Sheets

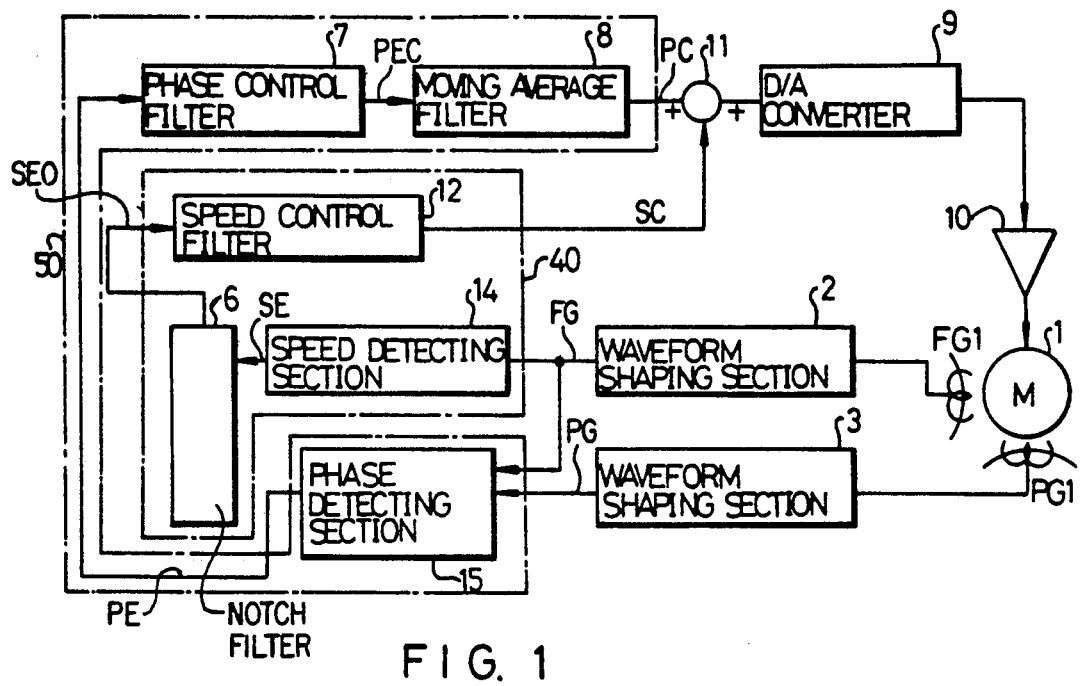
F I G. 1
F I G. 2A  FG
F I G. 2B  PG
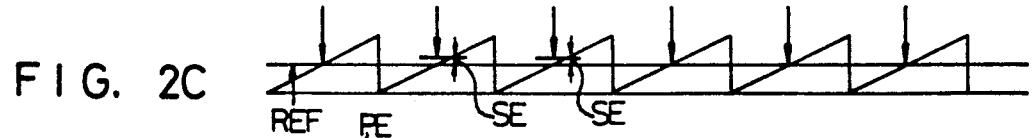
F I G. 2C
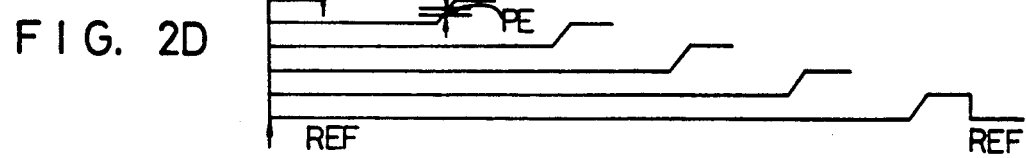
F I G. 2D

QUANTIZING ERROR REMOVING CIRCUIT FOR A ROTATIONAL CONTROL DEVICE

BACKGROUND OF THE INVENTION

The present invention relates to a quantizing error removing circuit of a rotational control device, and more particularly, in the rotational control device of a motor servo circuit in a video cassette recorder, or the like it relates to a quantizing error removing circuit which detects and removes the quantizing error of a rotational body so as to improve the efficiency of the rotational control device.

DESCRIPTION OF THE PRIOR ART

There are two kinds of servo circuits for a video cassette recorder, a drum servo circuit and a capstan servo circuit. Since a drum servo circuit directly affects the quality of image reproduced and displayed on screen, precise control of the rotational body, i.e., a drum motor, is required.

A rotational control device applied to such a drum servo circuit controls the speed of a motor and the phase thereof. That is, a speed control signal and a phase control signal are generated by utilizing pulse signals obtained from a frequency generator and a phase generator attached to the motor; these two signals are summed and converted to an analog signal which is fed to a motor driving circuit, controlling rotation of the motor.

FIG. 1 shows the configuration of a general rotational control device, in which a frequency generator FG1 for detecting rotational speed of current control motor 1, and a phase generator PG1 for detecting rotational phase of said motor 1, are attached to the motor 1.

The frequency generator FG1 generates six pulses per revolution of the motor 1, and a first waveform shaper 2 shapes the waveform of these pulses, outputting a speed detecting pulse FG. The phase generator PG1 generates one pulse per revolution of the motor 1, and a second waveform shaper 3 shapes the waveform of these pulses, outputting a phase detecting pulse PG.

Speed error processing section 40 comprises: a speed detecting section 4 for detecting a speed error SE from the speed detecting pulse outputted from the first waveform shaper 2; a notch filter 6 for removing a rotational defect component generated by an eccentric error of the drum (not shown) and a fixing error of the frequency generator FG1, that is, a rotational frequency of the drum and its higher harmonic components, from the speed error SE from said speed detecting section 4; and a speed control filter 12 for outputting a speed control signal SC by inputting an output SEO of said notch filter 6.

A phase error processing section 50 comprises: a phase detecting section 5 for detecting a phase error PE by utilizing the speed detecting pulse FG and the phase detecting pulse PG outputted from the waveform shapers 2,3; a phase control filter 7 for outputting a phase error control signal PEC by inputting an output of said phase detecting section 5; and a moving average filter 8 for removing a rotational defect component generated by an eccentric error of the drum, that is, a rotational frequency of the drum and its higher harmonic component, from the phase error control signal PEC from said phase control filter 7, outputting a phase control signal PC.

On the other hand, the rotational control device includes: a summer 11 for summing the speed control signal SC from the speed control filter 12 and the phase control signal PC from the moving average filter 8; a D/A converter 9 for converting an output of this summer 11 into an analog signal; and a motor driving section 10 which is operated by the output of this D/A converter 9 and controls the rotation of the motor 1.

Referring to FIG. 1 and FIG. 2, when the motor 1 rotates, the frequency generator FG1 generates six pulses per revolution of this motor, and these pulses are wave-shaped to square waves as in FIG. 2(A) by the first waveform shaping section 2, outputting a speed detecting pulse FG.

And the phase generator PG1 generates one pulse per revolution of the motor 1, and this pulse is outputted as a phase detecting pulse PG as in FIG. 2B through the second waveform shaping section 3.

The speed detecting pulse FG outputted from the first waveform shaping section 2 is inputted to the speed detecting section 4, and this speed detecting section 4, as in FIG. 2C, detects the difference between the rising edge of this speed detecting pulse FG and a reference level, outputting this value as a speed error SE. This speed error SE, from which rotational defect component caused by a fixing error or the like of the frequency generator FG1 is removed by the notch filter 6, and the output SED of this notch filter 6 is signal-processed by the speed control filter 12, outputting a speed control signal SE.

And the speed detecting pulse FG and the phase detecting pulse PG respectively outputted from the first and second waveform shaping sections 2,3 are inputted to the phase detecting section 5, and this phase detecting section 5 generates a phase error detecting waveform by utilizing these pulses FG,PG, and detects the difference between this phase detecting waveform and the speed detecting pulse FG, thereby calculating a phase error PE. This phase error PE is signal-processed by the phase control filter 7 and outputted as a phase error control signal PEC. This phase error control signal PEC is outputted as a phase control signal PC with the rotational defect component caused by eccentric error and the like of the drum removed by a moving average filter 8.

Thus, the speed control signal SC outputted from the speed control filter 12 and the phase control signal PC outputted from the moving average filter 8 are summed by a summer 11 and thereafter converted into an analog voltage signal by the D/A converter 9 and inputted to the motor driving section 10, and according to this, the motor driving section 10 can change the current to be fed to the motor 10 thereby controlling the rotational speed of the motor 10.

A moving average filter of a conventional rotational control device is shown in FIG. 4. As described above, the phase error control signal PEC is sequentially signal-delayed by series-connected delay elements 21-25, and said phase error control signal PEC and the outputs PEC1-PEC5 of the delay elements 21-25 are inputted to a summer 26 and summed. The output of this summer 26 is divided by a summed signal number, i.e., by 6 at a divider 27, and that divided quotient is outputted to the summer 11 of FIG. 1 as a phase control signal PC.

Accordingly, in a filter utilized for digital servo control, since numbers less than '0' are not present and only multiples of '1' are present, the remainder resulting from dividing the output value of the summer 26 by 6 at said divider 27, i.e., one among 0 to 5, becomes present as a quantization error in the output of the moving average filter.

FIG. 6 is a spectrum analysis chart of the input and output signals of a conventional moving average filter such as this. It is possible to know from the chart that the gain the of frequency spectrum of the output signal OUT is higher than the frequency spectrum of the input signal IN according to the presence of quantizing error as described before (i.e., A,B portions); and thereby becomes a cause of noise generation, and accordingly usefulness as a moving average filter is not maximized.

As a result, this quantizing error of filter works a transformation of the gain characteristic and the phase characteristic of a servo circuit.

SUMMARY OF THE INVENTION

Therefore, it is an object of the present invention, in order to solve the aforemention problems of the conventional art, in a rotational control device for concurrently executing speed control together with phase control, to provide a quantizing error removing circuit in a rotational control device, designed to minimize the change of gain characteristic of a control device in accordance with the quantizing error generated in phase control so that its performance is improved.

In order to attain this object, the quantizing error removing circuit of a rotational control device in accordance with the present invention comprises:

a rotation detecting means for detecting the rotational speed of a motor, thereby generating a speed detecting pulse and a phase detecting pulse;

a speed error processing means for detecting the speed error of said motor by utilizing said speed detecting pulse outputted from said rotation detecting means, and for outputting a speed control signal according to this;

a phase error processing means including a phase detecting means for detecting the phase error of said motor by utilizing said speed detecting pulse and said phase detecting pulse outputted from said rotation detecting means; a phase control filter for receiving the output of said phase detecting means and outputting a phase error control signal; and a moving average filter for removing a rotational period component and its higher harmonic component included in the phase error control signal outputted from said phase control filter, said moving average filter comprising:

a) a predetermined number of delay elements connected in series to each other in order to delay by a predetermined set time in turn said phase error control signal outputted from said phase control filter;

b) a summer for summing each output of said phase error control signal and said delay elements;

c) a divider for dividing the summed output value of said summer by the number of said summing signals, thereby outputting the divided quotient as a phase control signal; and d) another delay element for delaying the remainder value resulting from dividing said summed output value of said summer by said predetermined set time and for feeding said delayed remainder value back to said summer; wherein said remainder value fed back from said other delay element to said summer is summed with the summed value of said summer at the next sampling time point;

a summer for summing said speed control signal outputted from said speed error processing means and said phase control signal outputted from said phase error processing means; and a digital/analog converter for converting the output of said summer into an analog signal, thereby outputting a motor driving control signal.

The above object and other features of the present invention will become more apparent by describing the preferred embodiment of the present invention with reference to the accompanying drawings, in which:

FIG. 1 is a schematic block diagram of a rotational control device,

FIGS. 2A to 2D illustrate waveforms appeared at each section of FIG. 1,

Figure 4:
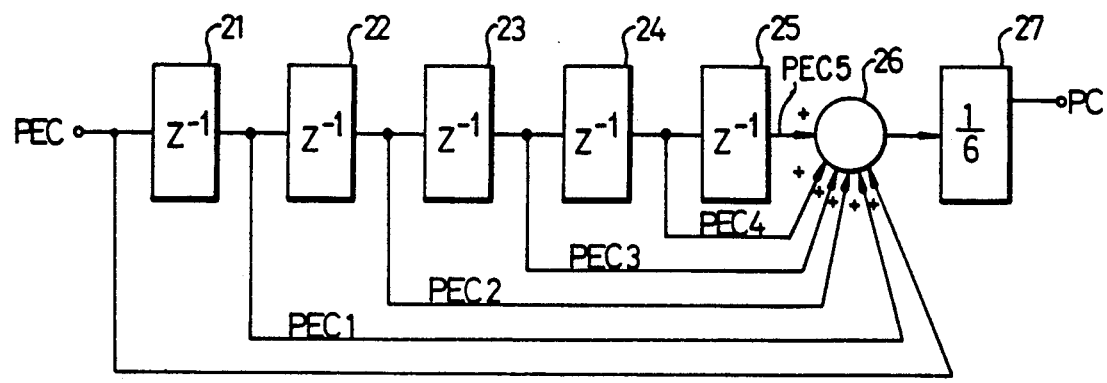
Figure 3:
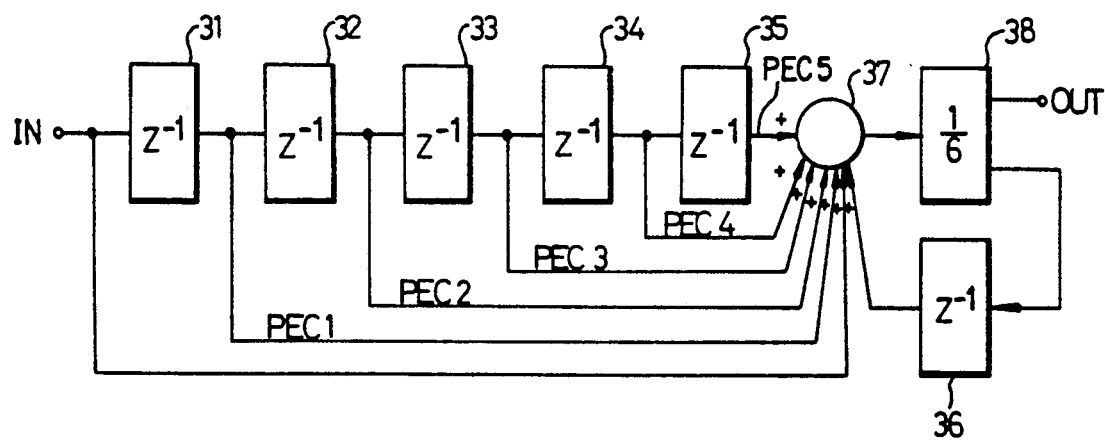
Figure 5:
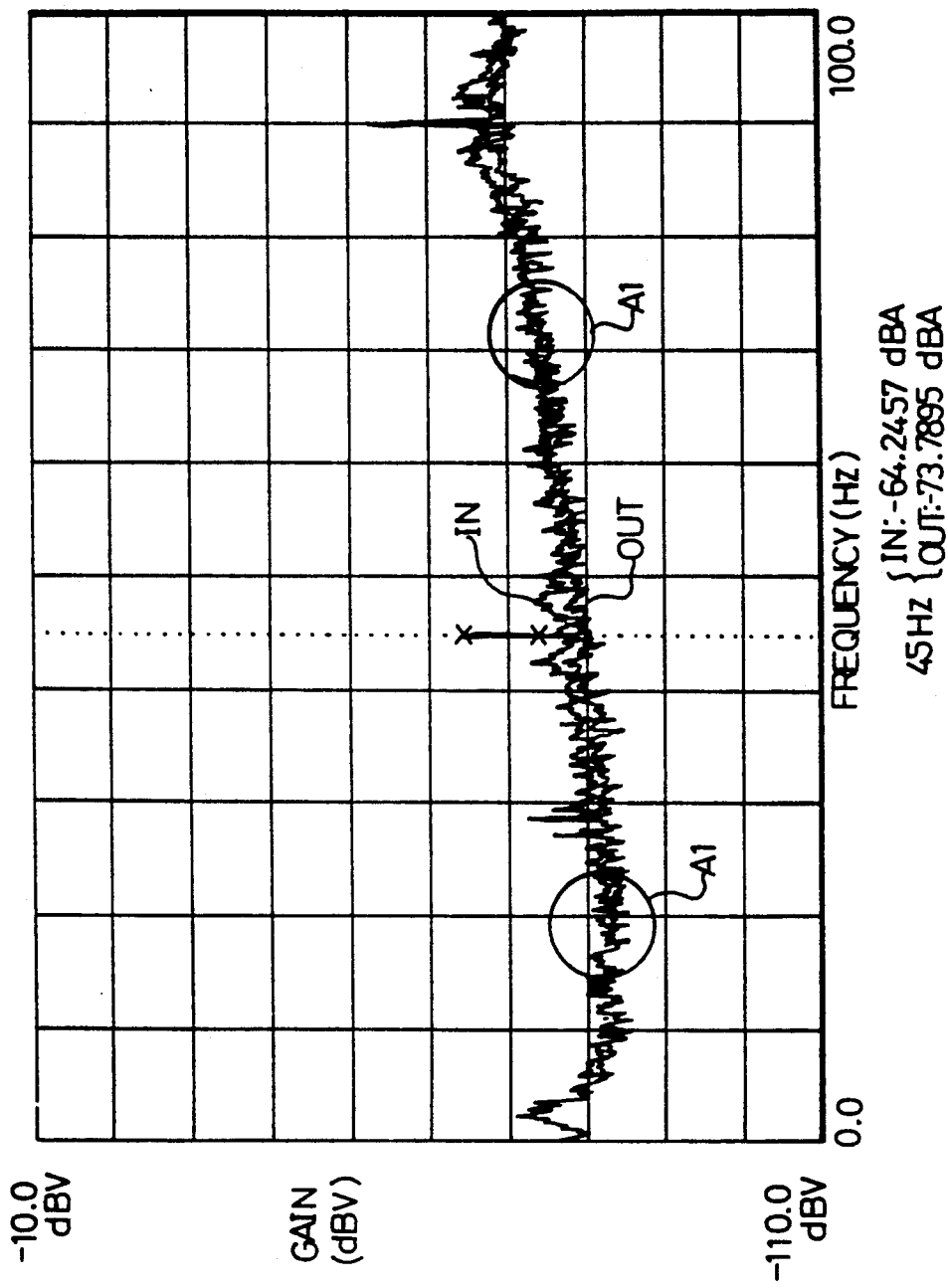
Figure 6:
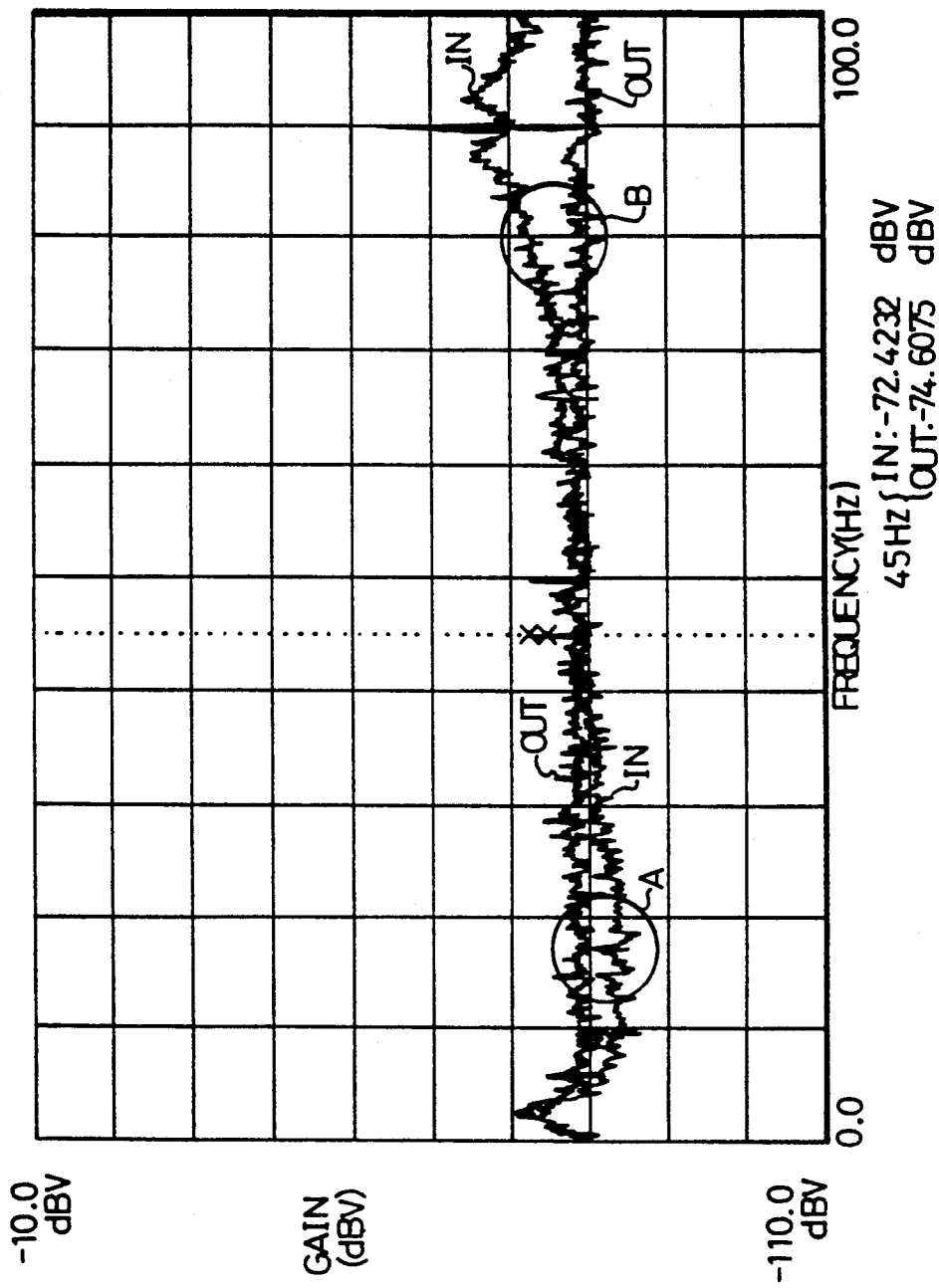

FIG. 3 is a block diagram illustrating a preferred embodiment of a moving average filter in accordance with the present invention, FIG. 4 is a block diagram illustrating a moving average filter of a conventional rotational control device, FIG. 5 is a spectrum analysis chart of input and output signals of a moving average filter in accordance with the present invention, and FIG. 6 is a spectrum analysis chart of input and output signals of a conventional moving average filter.

DETAILED DESCRIPTION OF THE PREFERRED EMBODIMENTS

FIG. 3 shows a preferred embodiment of the moving average filter in accordance with the present invention, and comprises: a predetermined set number of delay elements 31-35 connected in series for delaying for a predetermined set time in turn the phase error control signal PEC; a summer 37 for summing each output signal PEC1-PEC5 of the phase error control signal PEC and the delay elements 31-35; a divider 38 for dividing the summed value of this summer 37 by the number of said summing signals and outputting the divided quotient as a phase control signal PC; and a delay element 36 for feeding back the value of the remainder which results from dividing the summed value and is outputted from the divider 38 to said summer 37, being delayed for a predetermined set time.

First, the phase error control signal PEC outputted from the phase control filter 7 is sequentially signal-delayed through each delay element 31-35 connected in series, and the phase error control signal PEC and the outputs PEC1-PEC5 of each delay element 31-35 are inputted to the summer 37 and summed.

The output of this summer 37 is divided by 6, the number summed at the divider 38, and the divider quotient is outputted to the summer 11 of FIG. 1 as a phase control signal PC, and, on the other hand, remainder (one among the numbers 0-5) is fed back again to the summer 37 through the delay element 36 and summed at the next sampling time point. Accordingly, the quantizing error appearing in the moving average filter can be eliminated.

FIG. 5 is a spectrum analysis chart of the input and output signals of the moving average filter in accordance with the present invention, and the spectrum of the input signal IN substantially coincide with that of the output signal OUT throughout the entire frequency band.

And, the gain of 45 Hz (i.e., where the rotational frequency of drum is 45 Hz), which is the rotation detecting error, is decreased by approximately three times (10 dB) relative to the conventional filter of FIG. 6. This shows that the change of gain characteristic of the rotational control device caused by quantizating error is greatly decreased.

Thus, in accordance with the present invention, since the quantizing error generated in the output of the moving average filter is removed in phase control of the rotational control device, the rotational period component and the higher harmonic component are efficiently decreased and therefore there is the advantage that the efficiency of the rotational control device is improved.

What is claimed is:

1. Quantizing error removing circuit for a rotational control device comprising:
    a rotation detecting means for detecting the rotational speed of a motor, thereby generating a speed detecting pulse and a phase detecting pulse;
    a speed error processing means for detecting the speed error of said motor by utilizing said speed detecting pulse outputted from said rotation detecting means, and for outputting a speed control signal according to said detection;
    a phase error processing means including a phase detecting means for detecting the phase error of said motor by utilizing said speed detecting pulse and said phase detecting pulse outputted from said rotation detecting means; a phase control filter for receiving the output of said phase detecting means and outputting a phase error control signal: and a moving average filter for removing a rotational period component and its higher harmonic component included in the phase error control signal outputted from said phase control filter, said moving average filter comprising:
        a) a predetermined number of delay elements connected in series to each other in order to delay by a predetermined set time in turn in said phase error control signal outputted from said phase control filter;
        b) a summer for summing each output signal of said phase control filter and said delay elements;
        c) a divider for dividing the summed output value of said summer by the number of said summing signals, thereby outputting the divided quotient as a phase control signal; and
        d) another delay element for delaying the remainder value resulting from dividing said summed output value of said summer by said predetermined set time and for feeding said delayed remainder value back to said summer: wherein said remainder value fed back from said other delay element to said summer is summed with the summed value of said summer at a next sampling time point;
    a second summer for summing said speed control signal outputted from said speed error processing means and said phase control signal outputted from said divider; and
    a digital/analog converter for converting the output of said second summer into an analog signal, thereby outputting a motor driving control signal.

2. Quantizing error removing circuit for a rotational control device as claimed in claim 1, wherein said speed detecting pulse includes six pulses per revolution of said motor, and said phase detecting pulse includes one pulse per revolution of said motor.

3. Quantizing error removing circuit for a rotational control device as claimed in claim 1, further comprising a waveform shaping means for respectively shaping the waveforms of said speed detecting pulse and said phase detecting pulse outputted from said rotation detecting means.

4. Quantizing error removing circuit for a rotational control device as claimed in claim 1, wherein said speed error processing means comprises: a speed detecting section for detecting a speed error from said speed detecting pulse; a notch filter for removing a rotational period component and its higher harmonic component contained within the speed error from said speed detecting section; and a speed control filter for generating said speed control signal by inputting an output of said notch filter.

* * * * *